(12) United States Patent
Ohkura et al.

(10) Patent No.: US 7,313,323 B2
(45) Date of Patent: Dec. 25, 2007

(54) CAMERA SYSTEM WITH A PHOTOMETERING DEVICE AND AN EXTERNAL OPERATING DEVICE

(75) Inventors: Tadahisa Ohkura, Saitama (JP); Yutaka Ohsawa, Tokyo (JP); Shigeru Iwamoto, Saitama (JP); Hiroyuki Takahashi, Tochigi (JP)

(73) Assignee: PENTAX Corporation, Tokyo (JP)

( * ) Notice: Subject to any disclaimer, the term of this patent is extended or adjusted under 35 U.S.C. 154(b) by 101 days.

(21) Appl. No.: 11/017,789

(22) Filed: Dec. 22, 2004

(65) Prior Publication Data
US 2005/0141890 A1     Jun. 30, 2005

(30) Foreign Application Priority Data
Dec. 26, 2003   (JP)   ............... 2003-432148

(51) Int. Cl.
*G03B 7/00*   (2006.01)
(52) U.S. Cl. ............... 396/239; 396/238; 396/509
(58) Field of Classification Search ............... 396/245, 396/246, 461, 509, 239, 238, 276
See application file for complete search history.

(56) References Cited

U.S. PATENT DOCUMENTS

| | | | |
|---|---|---|---|
| 3,785,266 A | 1/1974 | Watanabe | ............... 396/214 |
| 3,872,482 A | 3/1975 | Akiyama | ............... 396/293 |
| 3,982,257 A | 9/1976 | Togashi | ............... 396/529 |
| 3,990,085 A | 11/1976 | Shono | |
| 4,692,010 A * | 9/1987 | Kataoka et al. | ............... 396/281 |
| 5,602,616 A | 2/1997 | Sato et al. | ............... 396/238 |
| 5,878,296 A * | 3/1999 | Ogi et al. | ............... 396/358 |

FOREIGN PATENT DOCUMENTS

| | | |
|---|---|---|
| JP | 5-061095 | 3/1995 |
| JP | 3153482 | 1/2001 |
| JP | 2001-109032 | 4/2001 |

OTHER PUBLICATIONS

English Language Abstract of JP 05-061095, no date.
English Language Abstract of JP 2001-109032, no date.

* cited by examiner

*Primary Examiner*—Diane Lee
*Assistant Examiner*—Chia-how Michael Liu
(74) *Attorney, Agent, or Firm*—Greenblum & Bernstein, P.L.C.

(57) ABSTRACT

A camera system includes a camera body including a photometering device and an external operating device, and a photographing lens which is detachably attached to the camera body, the photographing lens including an aperture setting device for selecting an auto aperture setting and at least one fixed aperture setting. A full-aperture photometering operation is performed when the aperture setting device is positioned at the auto aperture setting, and a stop-down photometering operation is performed in response to an operation of the external operating device when the aperture setting device is positioned at the fixed aperture setting.

20 Claims, 10 Drawing Sheets

CAMERA SYSTEM WITH A PHOTOMETERING DEVICE AND AN EXTERNAL OPERATING DEVICE

BACKGROUND OF THE INVENTION

1. Field of the Invention

The present invention relates to a camera system including a camera body and an interchangeable lens detachably attached to the camera body.

2. Description of the Related Art

In most SLR camera systems produced in recent years, the camera body is provided with a stop-down device for stopping down a diaphragm (iris diaphragm) of the interchangeable lens that is detachably attached to the camera body while the interchangeable photographing lens is provided with an automatic stop-down device which is actuated by the stop-down device of the camera body to stop down the diaphragm of the interchangeable lens. Such SLR camera systems are disclosed in, e.g., in the following publications: U.S. Pat. No. 5,602,616 (FIGS. 1 through 5), and U.S. Pat. No. 5,878,296 (FIG. 2).

In the interchangeable lenses having the aforementioned automatic stop-down device, various types of interchangeable lenses are known in the art: an interchangeable lens including a manual aperture setting device with which an aperture setting can be selected between an auto aperture setting (in which the aperture is set via the camera body) and a manual aperture setting (in which the aperture is set via the interchangeable lens), an interchangeable lens including a manual aperture setting device with which only manual aperture setting can be set, and an interchangeable lens including no manual aperture setting device.

On the other hand, in the camera bodies having the aforementioned stop-down device, some camera bodies cannot detect the f-number (aperture value) set by the manual aperture setting device of the interchangeable lens although being capable of inputting data on f-number at full aperture from the interchangeable lens. Namely, there is known a type of camera body which is not provided with any detecting device for detecting the f-number which is set by a manual aperture setting device of the interchangeable lens, e.g., by a rotational operation of the aperture setting ring (often marked in f-numbers) of the interchangeable lens in association with an aperture-setting ring member provided in the interchangeable lens.

In addition, among conventional SLR camera bodies, an SLR camera provided with a stop-down device which stops down the diaphragm of the interchangeable lens prior to a shutter release is known in the art. This type of SLR camera body is disclosed in the aforementioned Japanese patent publication No. 3153482.

However, in the case of a conventional camera body having no device for detecting neither the f-number at full aperture of the interchangeable lens nor the f-number set by the manual aperture setting device of the interchangeable lens, a correct exposure value cannot be set by actuating an exposure meter and a photometering device in association with the f-number set by the manual aperture setting device of the interchangeable lens.

SUMMARY OF THE INVENTION

The present invention has been devised in view of the above described problems on conventional SLR camera bodies, and provides a camera system in which correct exposure can be performed even if the camera body cannot detect the f-number set by the manual aperture setting device of the interchangeable lens.

According to an aspect of the present invention, a camera system is provided, including a camera body including a photometering device and an external operating device, and a photographing lens which is detachably attached to the camera body, the photographing lens including an aperture setting device for selecting an auto aperture setting and at least one fixed aperture setting. A full-aperture photometering operation is performed when the aperture setting device is positioned at the auto aperture setting, and a stop-down photometering operation is performed in response to an operation of the external operating device when the aperture setting device is positioned at the fixed aperture setting.

It is desirable for the camera system to be an SLR camera including the camera body and the photographing lens.

It is desirable for the external operating device to include a button which is provided on the camera body.

In another embodiment, a camera system is provided, including a camera body including an external operating device; a photographing lens which is detachably attached to the camera body, the photographing lens including an aperture setting device for selecting an auto aperture setting and at least one fixed aperture setting; a stop-down device for stopping down a diaphragm of the photographing lens of the camera system; a photometering device provided in the camera body for photometering a brightness of object light passed through the photographing lens; and a controller which controls operations of the stop-down device and the photometering device. The controller makes the photometering device perform a full-aperture photometering when the aperture setting device is positioned at the auto aperture setting, and the controller drives the stop-down device to stop down the diaphragm and makes the photometering device perform a stop-down photometering in response to an operation of the external operating device when the aperture setting device is positioned at the fixed aperture setting.

It is desirable for the camera system to include a processor for determining an appropriate shutter speed in accordance with a brightness value obtained from the stop-down photometering of the photometering device.

It is desirable for the controller to include a selectable specific exposure mode in which the stop-down photometering is performed when the external operating device is operated. The controller drives the stop-down device to stop down the diaphragm and makes the photometering device perform the stop-down photometering, and makes the processor determine the proper shutter speed in accordance with the brightness value obtained from the stop-down photometering when the external operating device is operated in the specific exposure mode.

It is desirable for the controller to drive the stop-down device to stop down the diaphragm and make the photometering device perform the stop-down photometering, and make the processor determine the appropriate shutter speed in accordance with the brightness value obtained from the stop-down photometering when the external operating device is operated in the case where the controller detects that the aperture setting device is not positioned at the auto aperture setting.

It is desirable for the processor to determine the appropriate shutter speed in accordance with the brightness value, which is obtained from the stop-down photometering, an ISO speed value and a reference f-number when the photometering device performs the stop-down photometering.

It is desirable for the camera system to include an indicator which visually indicates the appropriate shutter speed determined by the processor.

It is desirable for the camera system to include a memory in which a shutter speed determined by the processor is stored. An exposure is performed at the shutter speed stored in the memory.

It is desirable for the camera system to include an SLR camera including the camera body and the photographing lens.

It is desirable for the external operating device to include a button provided on the camera body.

In an embodiment of the present invention, a camera body is provided, to which a photographing lens, including an aperture setting device for selecting an auto aperture setting and at least one fixed aperture setting, is detachably attached, the camera body including a stop-down device for stopping down a diaphragm of the photographing lens; a photometering device for photometering a brightness of object light passed through the photographing lens; a controller which controls operations of the stop-down device and the photometering device; and an external operating device. The controller makes the photometering device perform a full-aperture photometering when the aperture setting device is positioned at the auto aperture setting, and the controller drives the stop-down device to stop down the diaphragm and makes the photometering device perform a stop-down photometering in response to an operation of the external operating device when the aperture setting device is positioned at the fixed aperture setting.

It is desirable for the camera body to include a processor for determining an appropriate shutter speed in accordance with a brightness value obtained from the stop-down photometering of the photometering device.

It is desirable for the controller to include a selectable specific exposure mode in which the stop-down photometering is performed when the external operating device is operated. The controller drives the stop-down device to stop down the diaphragm and makes the photometering device perform the stop-down photometering, and makes the processor determine the proper shutter speed in accordance with the brightness value obtained from the stop-down photometering when the external operating device is operated in the specific exposure mode.

It is desirable for the controller to drive the stop-down device to stop down the diaphragm and make the photometering device perform the stop-down photometering, and make the processor determine the appropriate shutter speed in accordance with the brightness value obtained from the stop-down photometering when the external operating device is operated in the case where the controller detects that the aperture setting device is not positioned at the auto aperture setting.

It is desirable for the processor to determine the appropriate shutter speed in accordance with the brightness value, which is obtained from the stop-down photometering, an ISO speed value and a reference f-number when the photometering device performs the stop-down photometering.

The camera body can include an indicator which visually indicates the appropriate shutter speed determined by the processor.

The camera body can include a memory in which a shutter speed determined by the processor is stored, wherein an exposure is performed at the shutter speed stored in the memory.

The camera body can be an SLR camera body.

According to the present invention, since a photometering operation is performed with the diaphragm of the photographing lens being stopped down, a correct exposure value can be obtained without the need for detection of the f-number set by the manual aperture setting device of the photographing lens.

The present disclosure relates to subject matter contained in Japanese Patent Application No. 2003-432148 (filed on Dec. 26, 2003) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
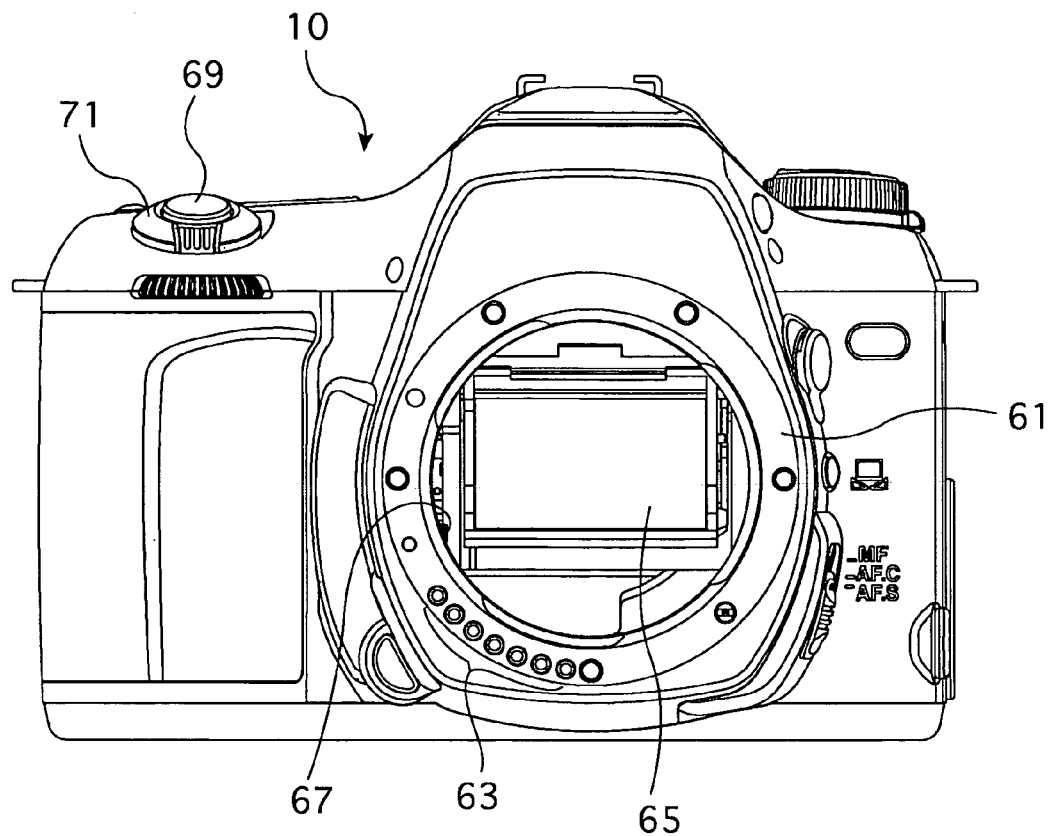
FIG. 1 is a front elevational view of an embodiment of a camera body of an SLR camera system according to the present invention.

A camera body 10 of an SLR camera system according to the present invention is provided, on the front of the camera body 10 at a substantially center thereof, with a body mount (mount ring) 61 to which a lens mount (not shown) of an interchangeable photographing lens 100 (represented by a labeled rectangle in FIG. 3) is detachably attached. The camera body 10 is provided on the body mount 61 with an information contact array 63 which come in contact with a corresponding contact array formed on the lens mount of the photographing lens 100. The camera body 10 is provided therein with a quick-return mirror 65, and is provided on the left of the quick-return mirror 65 with a diaphragm operating rod 67 for operating a diaphragm association rod (not shown) of a diaphragm mechanism of the photographing lens 100. The camera body 10 does not have any device for detecting the f-number set by a manual aperture setting device (generally an aperture setting ring) of the photographing lens 100. Note that the SLR camera body of the prior art is provided with a member which transfers the set f-number (which is set by a manual aperture setting device) and is provided inside the body mount on the right-hand side.

The camera body 10 is provided on top left thereof with a shutter-release button 69, and is provided around the shutter-release button 69 with a rotary power switch 71. The camera body 10 is provided behind the shutter button 69 with a green button (push button/external operating device) 73 and an external LCD panel 75.

Figure 2:
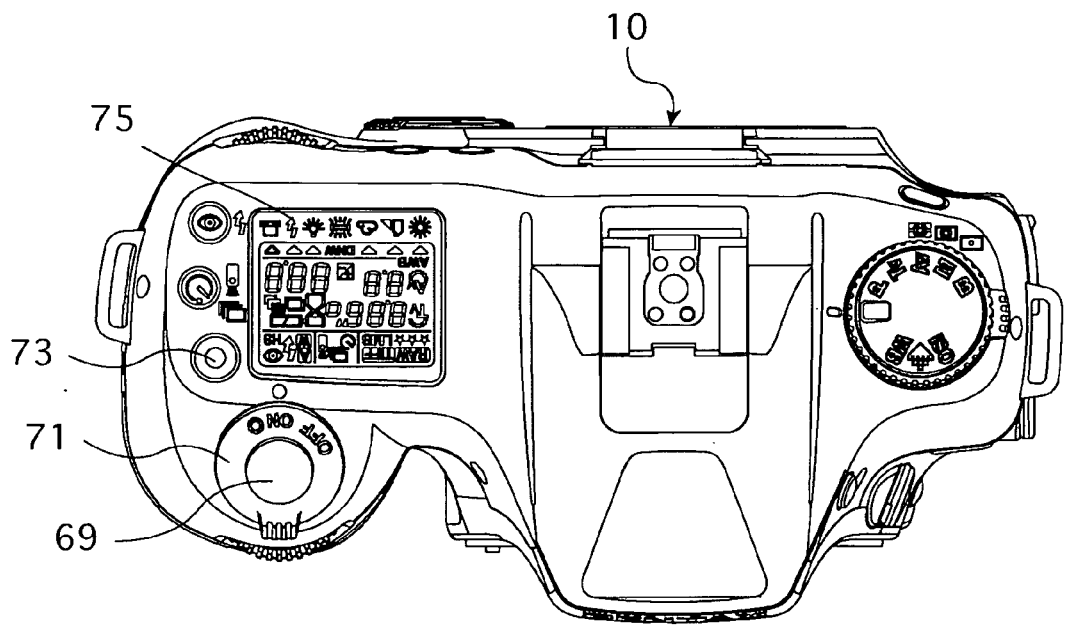
FIG. 2 is a plan view of the camera body shown in FIG. 1.

The rotary power switch 71 has three rotational positions: OFF position, ON position and Preview position (represented by a mark "○" printed on the rotary power switch 71) as shown in FIG. 2. The rotary power switch 71 clicks when turned to OFF position or ON position. The rotary power switch 71 can be turned to the preview position by turning the rotary power switch 71 in a rotational direction (clockwise direction as viewed in FIG. 2) opposite to the direction from ON position to OFF position against a spring force. Upon being turned from OFF position to ON position, the rotary power switch 71 stops with a click at the ON position to turn ON a main switch SWM. If the rotary power switch 71 is turned to the preview position from ON position, a preview switch SWP is turned ON with the main switch SWM remained ON.

The green button 73 is an external operational device which is in the form of a push button. Upon the green button 73 being depressed, a green switch SWG is turned ON.

Upon either the preview switch SWP or the green switch SWG being turned ON, the diaphragm operating rod 67 moves to a position whereby the iris diaphragm (not shown) is stopped down to the stop-down position of the photographing lens 100.

In the present embodiment of the camera system, if the green button 73 is depressed to turn ON the green switch SWG in a state where a lens-set aperture-priority exposure mode is selected, a diaphragm control circuit 19 is activated to stop down the diaphragm of the photographing lens 100 while a photometering calculation process is performed with the diaphragm of the photographing lens 100 being stopped down, i.e., a "stop-down photometering calculation process" is performed to calculate a proper shutter speed in accordance with a brightness value, an ISO speed value and others. This calculated shutter speed is stored in a RAM 11a as a shutter speed to be used at a time of exposure. This process makes it possible to achieve correct exposure with the f-number set by a manual aperture setting device of the photographing lens 100.

Figure 3:
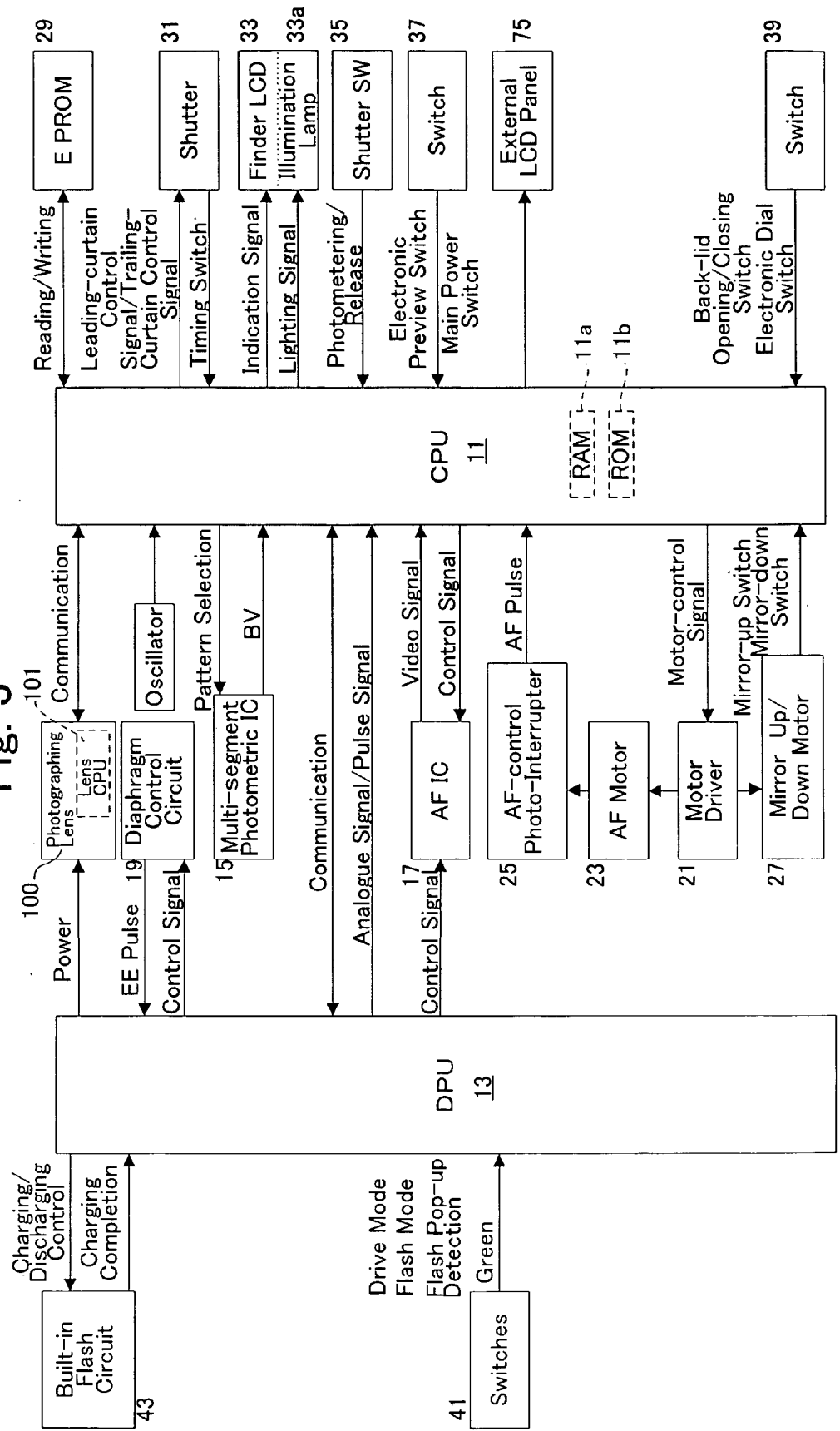
FIG. 3 is a block diagram of an embodiment of a main circuit of a control system of the SLR camera system according to the present invention.

FIG. 3 is a block diagram of an embodiment of a main circuit of a control system of the SLR camera system of the present embodiment. This control system is provided with a CPU 11 and a DPU 13 which are mutually connected to each other via a bus line. The CPU 11 and the DPU 13 serve as a controller for comprehensively controlling the overall system of the camera body 10.

If the photographing lens mounted to the camera body 10 is the photographing lens 100 equipped with a lens CPU 101, the CPU 11 communicates with the lens CPU 101 via the information contact array 63 on the body mount 61 and the information contact array (not shown) provided on the mount of the photographing lens 100. Various lens data peculiar to the photographing lens 100 such as lens-type data, f-number data at full aperture, minimum-aperture value data and focal length data are stored in a memory (not shown) provided in the photographing lens 100, and are input to the CPU 11 of the camera body 10 via data communication between lens CPU 101 and the CPU 11. The DPU 13 supplies power to the photographing lens 100 mounted to the camera body 10.

Upon an aperture setting ring (not shown) of the photographing lens 100 being turned from auto aperture setting position (auto position) to one of a plurality of fixed aperture setting positions (manual setting positions), a signal representing this change is transmitted from the lens CPU 101 to the CPU 11 via the information contact arrays 63 on the body mount 61. The CPU 11 receives this signal to determine that a manual setting position is selected in the photographing lens 100.

The CPU 11 is provided therein with a built-in ROM 11b in which programs regarding the camera's capabilities are written, and the RAM 11a in which various types of parameters and lens data are temporarily stored. The CPU 11 serves not only as a controller for comprehensively controlling the overall system of the camera body 10 but also serves fully or partly as a setting device, a shutter release controller, a judging device, and further serves as an arithmetic device which performs a photometering operation, an exposure operation and other operations.

The camera body 10 is provided with a multi-segment (multi-pattern) photometering IC 15 which receives the object light passed through the photographing lens 100 mounted on the camera body 10 to measure object brightness, and an AF (autofocus) IC 17 which operates to determine a focus state.

A light receiving area of the multi-segment photometering IC 15 is divided into sixteen light receiving areas, and each of these light receiving areas converts incident light into an electrical signal in accordance with the amount of light received, and outputs the electrical signal to the CPU 11 as a photometering signal (object brightness value Bv). The CPU 11 performs a predetermined exposure operation (AE operation) to determine a correct exposure value Ev in accordance with the object brightness value Bv and ISO speed value SV, and also determines a correct shutter speed TV (time value) and a correct aperture value AV in accordance with the currently-selected exposure mode. The CPU 11 further calculates the number of pulses (EE pulses) in accordance with the aperture value AV which are output from the CPU 11 in accordance with the amount of stop-down of the diaphragm when the diaphragm control circuit 19 drives a stop-down mechanism (not shown) of the camera body 10 to stop down the diaphragm (iris diaphragm) of the photographing lens 100. The calculated number of EE pulses is transferred to the DPU 13.

The DPU 13 drives the stop-down mechanism via the diaphragm control circuit 19, counts the EE pulses output from the diaphragm control circuit 19, and stops the stop-down mechanism immediately after the number of EE pulses counted equals the calculated number of EE pulses. The diaphragm control circuit 19 is provided with an electromagnetic actuator which actuates the stop-down mechanism to drive the stop-down mechanism.

A conventional stop-down mechanism such as disclosed in, e.g., the aforementioned Japanese patent publication No. 3153482 or Japanese laid-open patent publication 2001-109032 can be used as the aforementioned stop-down mechanism. For instance, such a conventional stop-down mechanism is provided with a cam mechanism that holds the diaphragm operating rod 67, which operates in association with the aforementioned diaphragm association rod (not shown) of the diaphragm mechanism of the photographing lens 100, at a full-aperture position from the stop-down position side, and is further provided with an electromagnetic actuator which drives the cam mechanism. The diaphragm operating rod 67 is biased in a stop-down direction by a spring force to be prevented from moving in a direction to open the diaphragm from the stop-down position by the cam mechanism. The diaphragm operating rod 67 is normally held at a full-aperture/auto-aperture position to hold the diaphragm association rod of the diaphragm mechanism of the photographing lens 100 at a position (full-aperture position) to fully open the diaphragm.

If the electromagnetic actuator of the stop-down mechanism makes the cam mechanism move to a stop-down position thereof, the diaphragm operating rod 67 becomes capable of moving to its stop-down position by a spring force, while the diaphragm association rod of the diaphragm mechanism of the photographing lens 100 allows the diaphragm operating rod 67 to move to the stop-down position thereof by a spring force. If the electromagnetic actuator of the stop-down mechanism makes the cam mechanism move to a full-aperture position thereof, the diaphragm operating rod 67 is made to move to the full-aperture position thereof against the spring force. At this time, the diaphragm operating rod 67 moves the diaphragm association rod of the diaphragm mechanism of the photographing lens 100 forcibly to the full-aperture position thereof.

The diaphragm control circuit 19 of the camera body 10 is provided with a photo-interrupter (not shown) which outputs EE pulses in association with movement of the diaphragm operating rod 67, and an electromagnetic latch mechanism (not shown) which prevents the diaphragm operating rod 67 from moving in a direction toward the stop-down position thereof. If the electromagnetic actuator makes the cam mechanism move to the full-aperture position thereof at a shutter release, the diaphragm operating rod 67 moves in a direction toward the full-aperture position thereof. Since the photo-interrupter of the diaphragm control circuit 19 outputs EE pulses in association with movement of the operating rod 67, the electromagnetic latch mechanism is actuated to prevent further movement of the diaphragm operating rod 67 upon the number of EE pulses counted by the DPU 13 becoming equal to a predetermined number. This operation of preventing further movement of the diaphragm operating rod 67 prevents the diaphragm association rod of the diaphragm mechanism of the photographing lens 100 from further movement in the stop-down direction so that the diaphragm is set at this aperture setting.

The AF IC 17 is provided with a plurality of phase-difference CCD line sensors. Each CCD line sensor receives an associated pair of split images to convert the pair of split images into a pair of video signals, each related to brightness signal, and outputs the pair of video signals to the CPU 11. The CPU 11 determines an amount of defocus from the pair of video signals, and further determines an amount of driving of the AF motor 23 and the driving direction thereof which are necessary for making the amount of defocus zero. The amount of driving of the AF motor 23 is determined as the number of AF pulses output from an AF-control photo-interrupter 25 which operates in association with the operation of the AF motor 23. The AF motor 23 is driven via a motor driver 21, and rotation of the AF motor 23 is transmitted to an AF transmission mechanism (not shown) in the photographing lens 100 via an AF drive mechanism (not shown). This AF transmission mechanism in the photographing lens 100 drives a predetermined AF cam mechanism in the photographing lens 100 to move a focusing lens group in an optical axis direction.

The control system of the camera body 10 shown in FIG. 3 is provided with a mirror-up/down motor 27 for moving the quick-return mirror 65 up and down. The CPU 11 drives the mirror-up/down motor 27 via the motor driver 21 to move the quick-return mirror 65 up and down.

An EEPROM 29, a focal plane shutter 31, the external LCD panel 75, a finder LCD 33, an illumination lamp 33a for the finder LCD 333, a shutter switch (photometering switch SWS and release switch SWR) 35, switches (the power switch SWM and the preview switch SWP) 37, and other switches 39 such as a back-lid opening/closing switch and an electronic dial switch are all connected to the CPU 11. The finder LCD 33 is installed in a viewfinder of the camera body 10. The shutter switch 35 operates in association with the shutter-release button 69. The switches 37 operate in association with the rotary power switch 71. Various types of data related to taking a photograph are stored in the EEPROM 29 and are read out by the CPU 11 as needed. The LCD drive circuit 33 controls indications of various information on the camera system (photographing mode, shutter speed, f-number, the number of exposed frames, battery condition, etc.) on the external LCD panel 75 and the finder LCD 33. The photometering switch SWS is turned ON when the release button 69 is half depressed, and the release switch SWR is turned ON when the release button 69 is fully depressed.

Various switches 41 such as the green switch SWG, which operates in association with the green button 73, a drive mode switch, a flash mode switch and a flash pop-up detection switch are connected to the DPU 13. The DPU 13 determines the setting of the camera body 10 in accordance with the state of the switches 41.

The camera body 10 is provided with a built-in flash circuit 43 which is connected to the DPU 13. The DPU 13 controls light emission of the built-in flash circuit 43 so that the built-in flash circuit 43 discharges as required.

Operations of the camera body 10 will be hereinafter discussed in detail with reference to the flow charts shown in FIGS. 4 and 5. The operations in these flow charts are performed according to programs written in built-in ROM 11b provided in the CPU 11.

Figure 4:
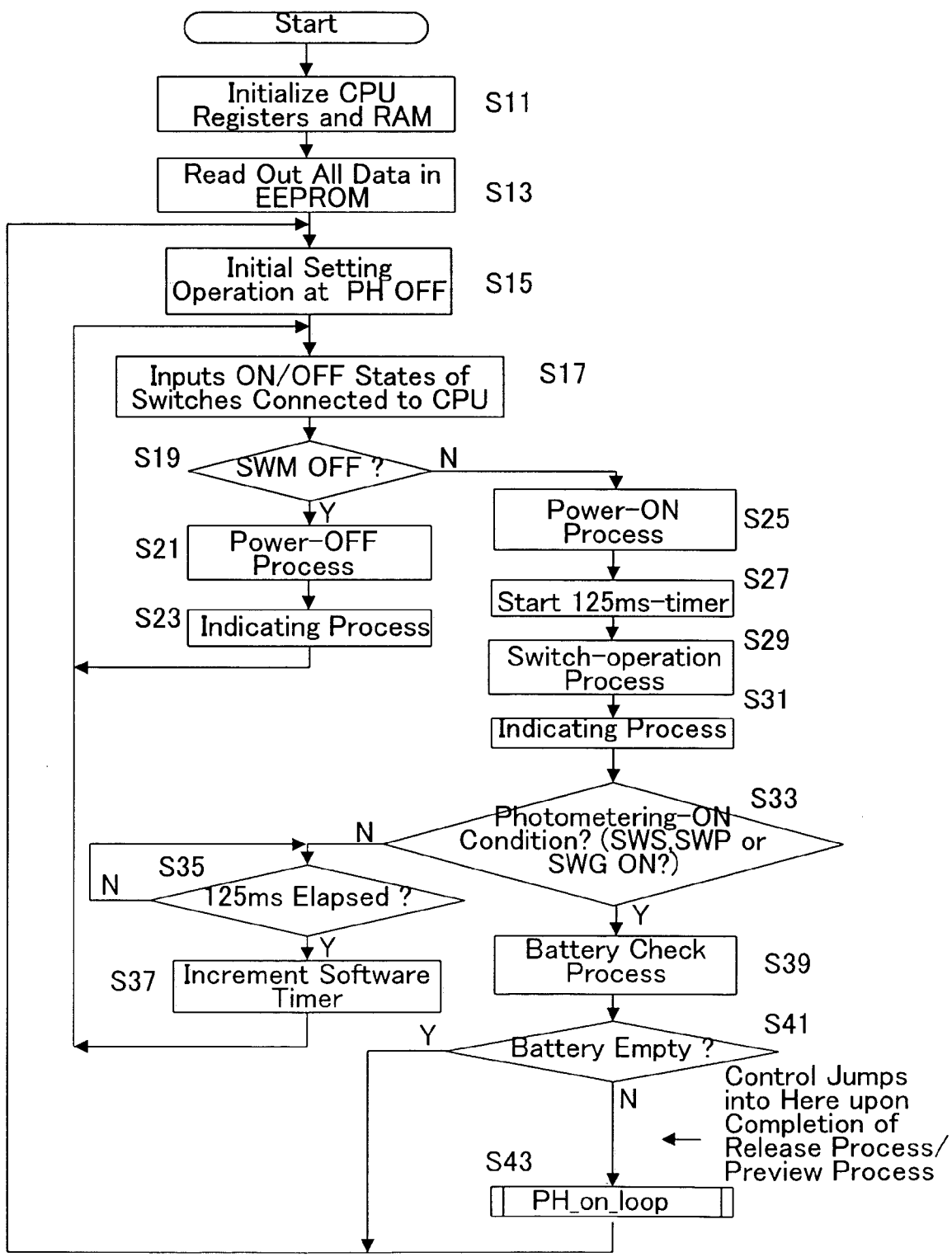
FIG. 4 is a flow chart showing a main routine of the camera body of the SLR camera system according to the present invention.

FIG. 4 shows a main routine of the camera body 10 which is performed when a battery(s) (not shown) is loaded in the camera body 10. Immediately after the battery is loaded in the camera body 10, the CPU 11 initializes internal devices thereof such as an internal register, each I/O port and the RAM 11a (step S11), and subsequently reads out all data written in EEPROM 29 (step S13). The operations at steps S11 and S13 are performed only once upon the battery being loaded in the camera body 10. Thereafter, an initial setting operation at power-hold off (PHoff) (step S15) and the subsequent operations are repeated.

Subsequently, the CPU 11 inputs ON/OFF states of switches connected to the CPU 11 (step S17), and determines whether the main switch SWM is OFF (step S19). If the main switch SWM is OFF (if YES at step S19), a power-OFF process is performed (step S21), an indicating process at power-off is performed (step S23), and control returns to step S17 to repeat operations at steps S17 through S23 until the main switch SWM is turned ON.

If the main switch SWM is turned ON (if NO at step S19), a power-on process is performed to make photographing operations possible (step S25), a 125 ms-timer is started (step S27), a switch-operation process, in which operations corresponding to ON states of switches regarding input mode settings are performed, is performed (step S29), and an indicating process in a power-on state is performed (step S31). In this indicating process, for instance, various photographing information such as photographing mode, the number of remaining frames and battery condition are indicated on the external LCD panel 75.

Subsequently, it is determined whether the photometering switch SWS, the preview switch SWP or the green switch SWG is ON (step S33). If any of these switches are not ON (if NO at step S33), it is determined whether 125 ms has elapsed (step S35). If it is determined that 125 ms has elapsed (if YES at step S35), a software timer is incremented (step S37), and control returns to step S17. The 125 ms-timer serves as a timer for setting a cycle period for periodically checking ON/OFF states of the main switch SWM and other switches. Namely, the CPU 11 periodically checks ON/OFF states of the photometering switch SWS, the preview switch SWP and the green switch SWG at intervals of 125 ms in a state where the main switch SWM is ON.

If it is determined at step S33 that the photometering switch SWS, the preview switch SWP or the green switch SWG is ON (if YES at step S33), a battery check process is performed (step S39). Subsequently, it is determined whether the battery is empty (step S41). If the battery is empty (if YES at step S41), control returns to step S15. If the battery is not empty (if NO at step S41), control enters a PH_on_loop process (step S43), and returns to step S15 upon completion of the PH_on_loop process.

PH_on_Loop Process

Figure 5:
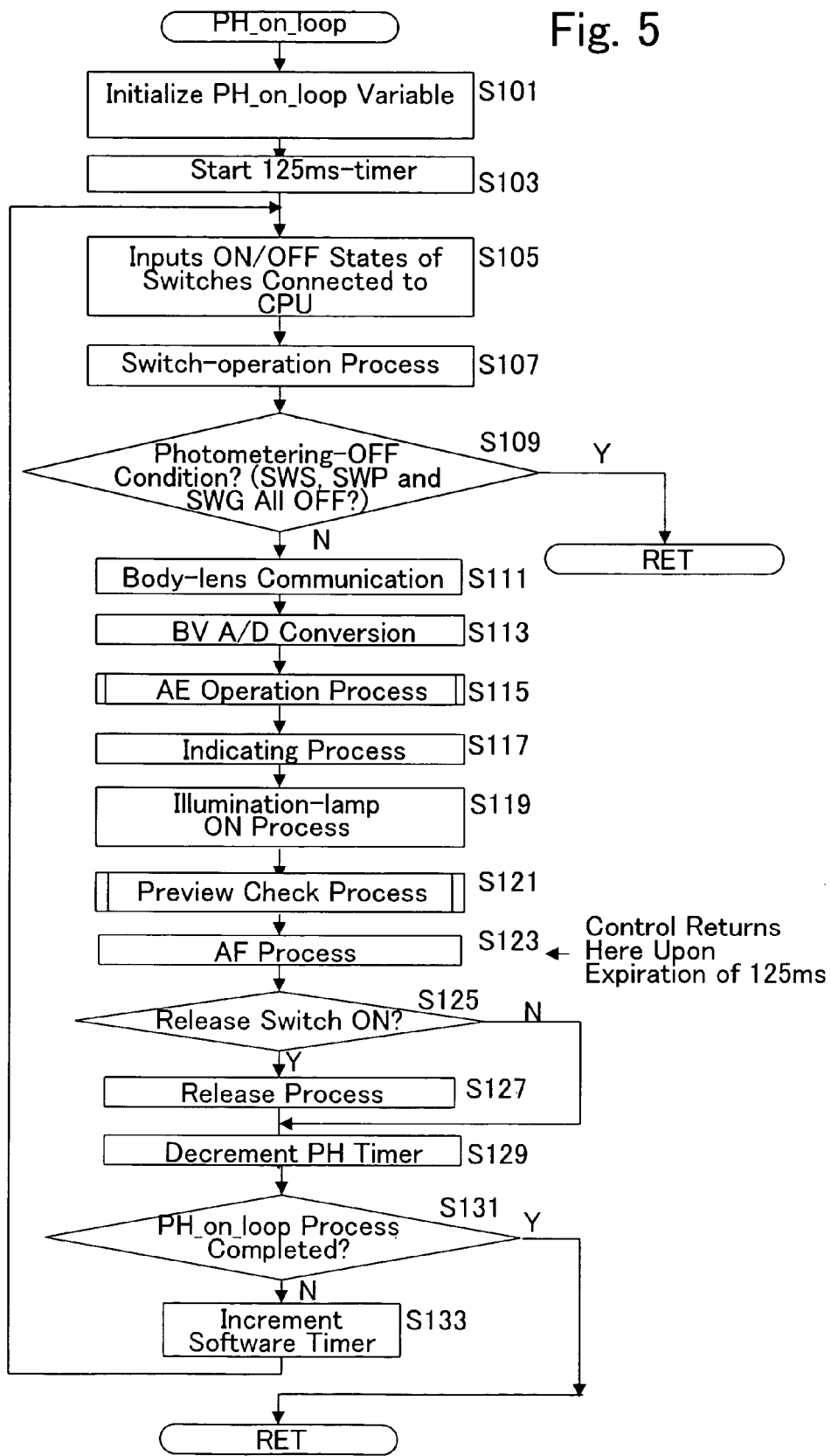
FIG. 5 is a flow chart showing a subroutine "PH_ON_LOOP" shown in FIG. 4.

FIG. 5 is a flow chart showing the PH_on_loop process. In this process, a PH-on-loop variable is initialized (step S101), and the 125 ms-timer is started (step S103). The PH-on-loop variable is a value for which a PH (power hold) timer is set, and which represents the number of times the PH_on_loop process is to be repeated. The 125 ms-timer at step S103 serves as a timer for setting a cycle period for periodically performing an AF process at step S123. Thereafter, operations at steps S105 through S133 are repeated at intervals of 125 ms under certain conditions, e.g., during the time the photometering switch SWS remains ON, and control returns to the main routine shown in FIG. 4 (i.e., control proceeds to step S15) after the operations at steps S105 through S133 have been repeated the number of times corresponding to the set PH-on-loop variable.

The CPU 11 inputs an ON/OFF state of each switch (step S105), and performs operations according to the states of switches which are turned ON (step S107). For instance, such operations include a shutter-speed changing operation and an f-number changing operation.

Subsequently, it is determined whether the camera body 10 is under a photometering-off condition in which the photometering switch SWS, the green switch SWG and the preview switch SWP are all in an OFF state (step S109). If the camera body 10 is under the photometering-off condition (if YES at step S109), control returns to the main routine shown in FIG. 4.

If it is determined that the camera body 10 is not under the photometering-off condition (if NO at step S109), the CPU 11 communicates with the lens CPU 101 to input lens data peculiar to the photographing lens 100 such as lens type data, full-aperture data, minimum-aperture value data and focal length data (step S111). Subsequently, the multi-segment photometering IC 15 is activated to measure the object brightness, which is in turn converted into a digital signal to perform a full-aperture photometering (open-aperture photometering) to obtain data on object brightness value Bv (step S113). Thereafter, an AE calculation process is performed in accordance with this object brightness value Bv and ISO speed value SV to determine a combination of a shutter speed and an f-number for exposure (step S115).

Subsequently, values of the determined shutter speed and f-number are indicated on the external LCD panel 75 and the finder LCD 33 (step S117), while the illumination lamp 33a for the finder LCD 33 is turned ON (step S119).

Subsequently, a preview check process is performed (step S121). In this process, the diaphragm control circuit 19 is made to perform a stop-down operation to stop down the diaphragm of the photographing lens 100. Only the diaphragm of the photographing lens 100 is stopped down at this time in the case where control enters the preview check process on condition that the preview switch SWP is ON, whereas a photometering operation is performed with the diaphragm of the photographing lens 100 being stopped down, i.e., a stop-down (aperture) photometering operation is performed, in the case where control enters the preview check process on condition that the green switch SWG is ON. Subsequently, the AF process is performed to move the focusing lens group of the photographing lens 100 to an in-focus position (step S123).

Upon completion of the AF process at step S123, it is determined whether the release switch SWR is ON (step S125). If the release switch SWR is ON (if YES at step S125), a release process is performed (step S127), and control proceeds to step S129. If the release switch SWR is not ON (if NO at step S125), control skips the release process and proceeds to step S129.

At step S129 the PH timer is decremented by one. Subsequently, it is determined whether the PH_on_loop process is completed, i.e., whether the PH timer is zero (step S131). If the PH_on_loop process is completed (if YES at step S131, control returns to the main routine shown in FIG. 4. If the PH_on_loop process is not completed (if NO at step S131), the software timer is incremented (step S133), and control returns to step S105. This software timer is a timer which is incremented every 125 ms.

Preview Check Process

Figure 6:
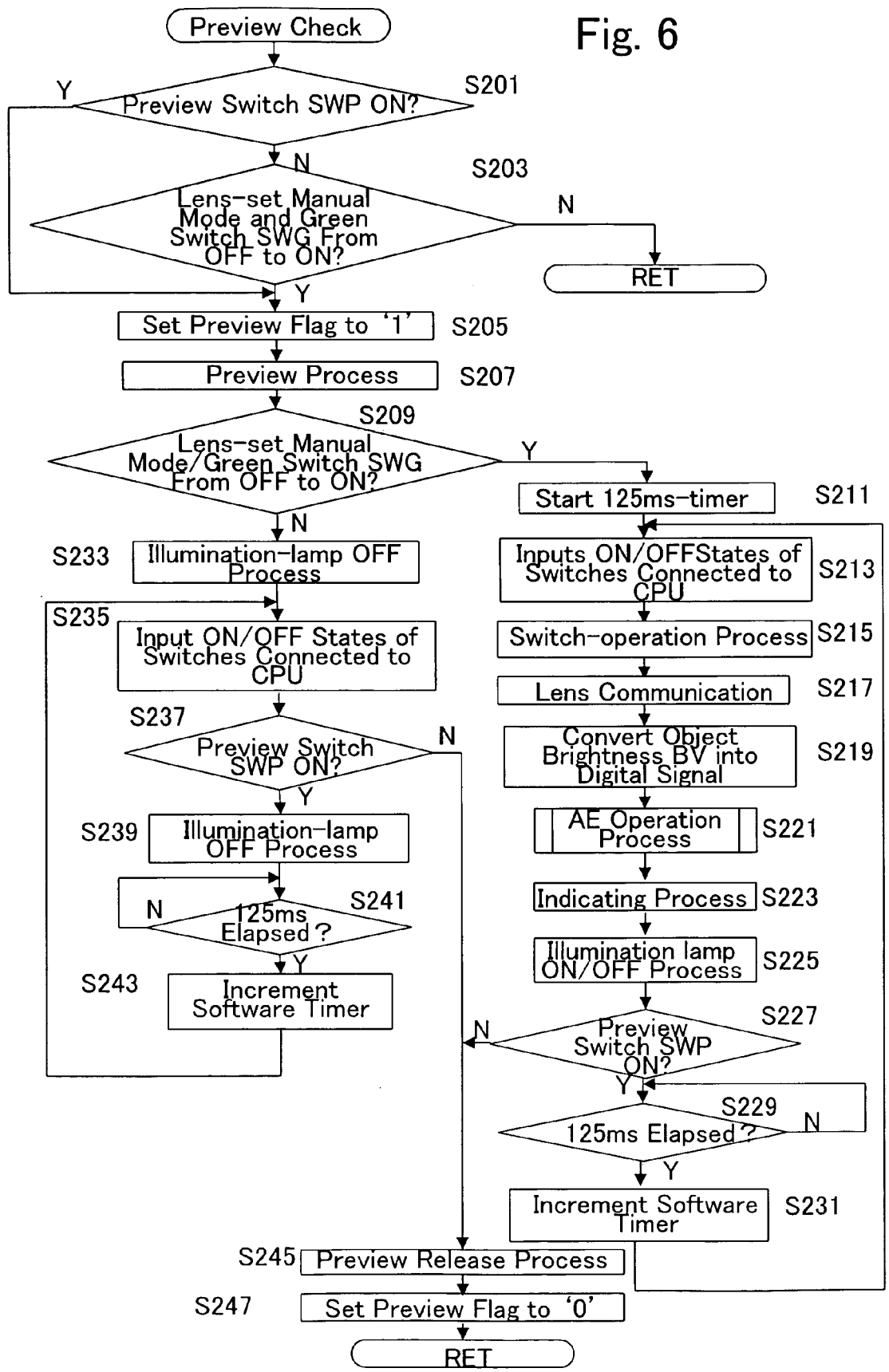
FIG. 6 is a flow chart showing a subroutine "PREVIEW CHECK" shown in FIG. 5.

The preview check process that is performed at step S121 will be hereinafter discussed in detail with reference to the flow chart shown in FIG. 6. In this process, when the preview switch SWP or the green switch SWG is turned ON, the diaphragm control circuit 19 is activated to move the diaphragm operating rod 67 to a stop-down permissible position thereof, and the diaphragm mechanism of the photographing lens 100 is stopped down to a point corresponding to the f-number set by the manual aperture setting device of the photographing lens 100. Moreover, when control enters the preview check process after the green switch SWG is turned ON, a stop-down photometering operation is performed (i.e., a photometering operation is performed with the diaphragm of the photographing lens 100 being stopped down) and the AE calculation process is performed.

In the preview check process, firstly it is determined whether the preview switch SWP is ON (step S201). If the preview switch SWP is ON (if YES at step S201), control proceeds to step S205. If the preview switch SWP is OFF (if NO at step S201), it is determined whether a lens-set manual mode is selected while the green switch SWG is ON (step S203). If the lens-set manual mode is selected while the green switch SWG is ON (if YES at step S203), control proceeds to step S205. If the preview switch SWP is not ON (if NO at step S201) and if the lens-set manual mode is not selected or the green switch SWG is not ON (if NO at step S203), control returns to the subroutine shown in FIG. 5 (i.e., control proceeds to step S123).

In the lens-set manual mode, the f-number is set by an operation of the manual aperture setting device (aperture setting ring) of the photographing lens 100. The f-number is fixed by setting the opening of the diaphragm to correspond to the rotational position of the aperture setting ring. Although there are two exposure modes available: a manual exposure mode in which each of the f-number and the shutter speed can be manually selected and an aperture-priority exposure mode in which the shutter speed is automatically set, operations in the manual exposure mode will be hereinafter discussed.

A preview flag is set to '1' at step S205, and a preview process is performed (step S207). In the preview process, the diaphragm control circuit 19 is activated so that the diaphragm of the photographing lens 100 is stopped down to a point corresponding to the f-number set by the manual aperture setting device, or the f-number set by the CPU 11 in the case of auto-aperture setting mode. The diaphragm of the photographing lens 100 is stopped down to a point corresponding to the f-number set manually or automatically through the preview process.

Upon completion of the preview process, it is determined whether lens-set manual mode is selected while the green switch SWG is ON (step S209). If lens-set manual mode is selected while the green switch SWG is ON (if YES at step S209), control proceeds to step S211. If lens-set manual mode is not selected or the green switch SWG is not ON (if NO at step S209), control proceeds to step S233. In the present embodiment of the camera system, there are the following exposure modes available: a lens-set aperture-priority exposure mode, a lens-set manual exposure mode, a lens-set aperture-priority flash exposure mode, and a lens-set flash manual exposure mode.

Preview

Operations in the case where the green switch SWG is not turned ON in lens-set manual mode though the preview switch SWP is ON (if NO at step S209) will be hereinafter discussed.

If lens-set manual mode is not selected or the green switch SWG is not ON (if NO at step S209), the illumination lamp 33a is turned OFF (step S233). Subsequently, the CPU 11 inputs ON/OFF states of the switches connected to the CPU 11 (step S235), and it is determined whether the preview switch SWP is ON (step S237). If the preview switch SWP is ON (if YES at step S237), the illumination lamp 33a is turned OFF (step S239) and it is determined whether 125 ms has elapsed (step S241). If 125 ms has elapsed (if YES at step S241), the software timer is incremented (step S243) and control returns to step S235.

If the preview switch is not ON (if NO at step S237), a preview release process is performed (step S245), the preview flag is set to '0' (step S247), and control returns to the subroutine shown in FIG. 5 (specifically proceeds to step S123). In the preview release process at this time, the diaphragm control circuit 19 drives the electromagnetic actuator of the stop-down mechanism so that as to enter a full aperture state to make the diaphragm operating rod 67 return to the full-aperture position thereof. The diaphragm mechanism of the photographing lens 100 returns to the full-aperture position thereof via the preview release process.

Stop-Down Photometering

Operations in the case where the green switch SWG is turned ON in the lens-set manual mode while the preview switch SWP is ON (if YES at step S209) will be hereinafter discussed.

If it is determined at step S209 that lens-set manual mode is selected while the green switch SWG is ON (if YES at step S209), the 125 ms-timer is started (step S211). Subsequently, the CPU 11 inputs an ON/OFF state of each switch (step S213), and performs operations according to the states of switches which are turned ON (step S215). Subsequently, the CPU 11 communicates with the lens CPU 101 to input lens data, the multi-segment photometering IC 15 is activated to measure the object brightness, which is in turn converted into a digital signal to obtain data on object brightness value Bv (step S219). The object brightness value Bv obtained at step S219 is that obtained in a state where the diaphragm mechanism of the photographing lens 100 is stopped down to a point corresponding to the f-number set by the manual aperture setting device of the photographing lens 100. Thereafter, the AE calculation process is performed in accordance with this object brightness value Bv and ISO speed value SV to determine a combination of a shutter speed and an f-number for exposure (step S221). Subsequently, values of the determined shutter speed and f-number are indicated on the external LCD panel 75 and the finder LCD 33 (step S223), while the illumination lamp 33a for the finder LCD 33 is turned ON (step S225). Accordingly, a correct shutter speed obtained by the stop-down photometering operation is indicated relative to the f-number set on the photographing lens side.

Subsequently, it is determined whether the preview switch SWP is ON (step S227). If the preview switch SWP is ON (if YES at step S227), it is determined whether 125 ms has elapsed (step S229). If 125 ms has elapsed (if YES at step S229), the software timer is incremented (step S231), and control returns to step S213. If the preview switch SWP is not ON (if NO at step S227), the preview release process is performed (step S245), the preview flag is set to '0' (step S247), and control returns to the subroutine shown in FIG. 5 (specifically proceeds to step S123). In the preview release process at this time, the diaphragm control circuit 19 is stopped to make the diaphragm operating rod 67 return to the full-aperture position thereof.

AE Calculation Process

Figure 7:
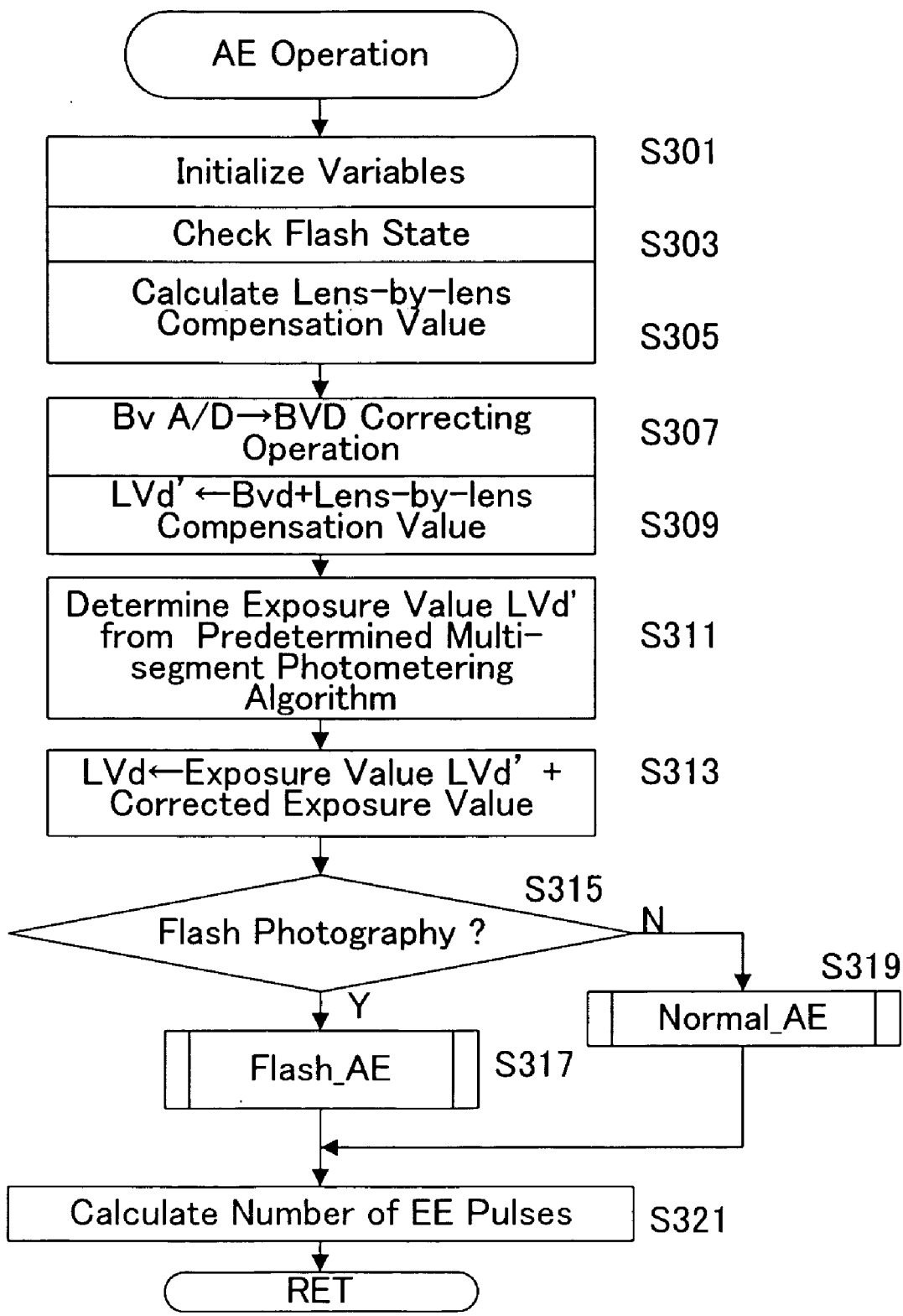
FIG. 7 is a flow chart showing a subroutine "AE OPERATION" shown in FIG. 6.

The AE calculation process performed at steps S115 and S221 will be hereinafter discussed in detail with reference to the flow chart shown in FIG. 7.

In the AE calculation process, variables which are used in calculation process are initialized (step S301). Subsequently, it is determined whether the flash is ready-to-discharge (step S303), and a lens-by-lens compensation value is calculated in accordance with lens data input via communication between the CPU 11 and the lens CPU 101 (step S305).

Subsequently, an adjustment value for adjusting the individual difference of the built-in multi-segment photometering IC 15 is read out of the EEPROM 29 while the measured object brightness value Bv is corrected in accordance with the adjustment value to determine a corrected object brightness value Bvd (step S307), and an exposure value LVd' is determined from a predetermined multi-segment photometering algorithm in accordance with the corrected object brightness value Bvd and the lens-by-lens compensation value (steps S309 and S311). The exposure value LVd' designates the luminance of the light actually received by the multi-segment photometering IC 15.

An exposure value LVd is determined from the exposure value LVd', the ISO speed value SV and an exposure compensation value.

Subsequently, it is determined whether flash photography is required (step S315). If flash photography is not required (if NO at step S315), a fixed-light (normal-light) AE calculation process (Normal_AE) is performed to determine an exposure value (step S319), the number of EE pulses is calculated in accordance with this exposure value (step S321) and control returns. If flash photography is required (if YES at step S315), a flash AE calculation process (Flash_AE) is performed to determine an exposure value (step S317), the number of EE pulses is calculated in accordance with this exposure value (step S321), and control returns.

Fixed-Light AE Calculation Process

Figure 8:
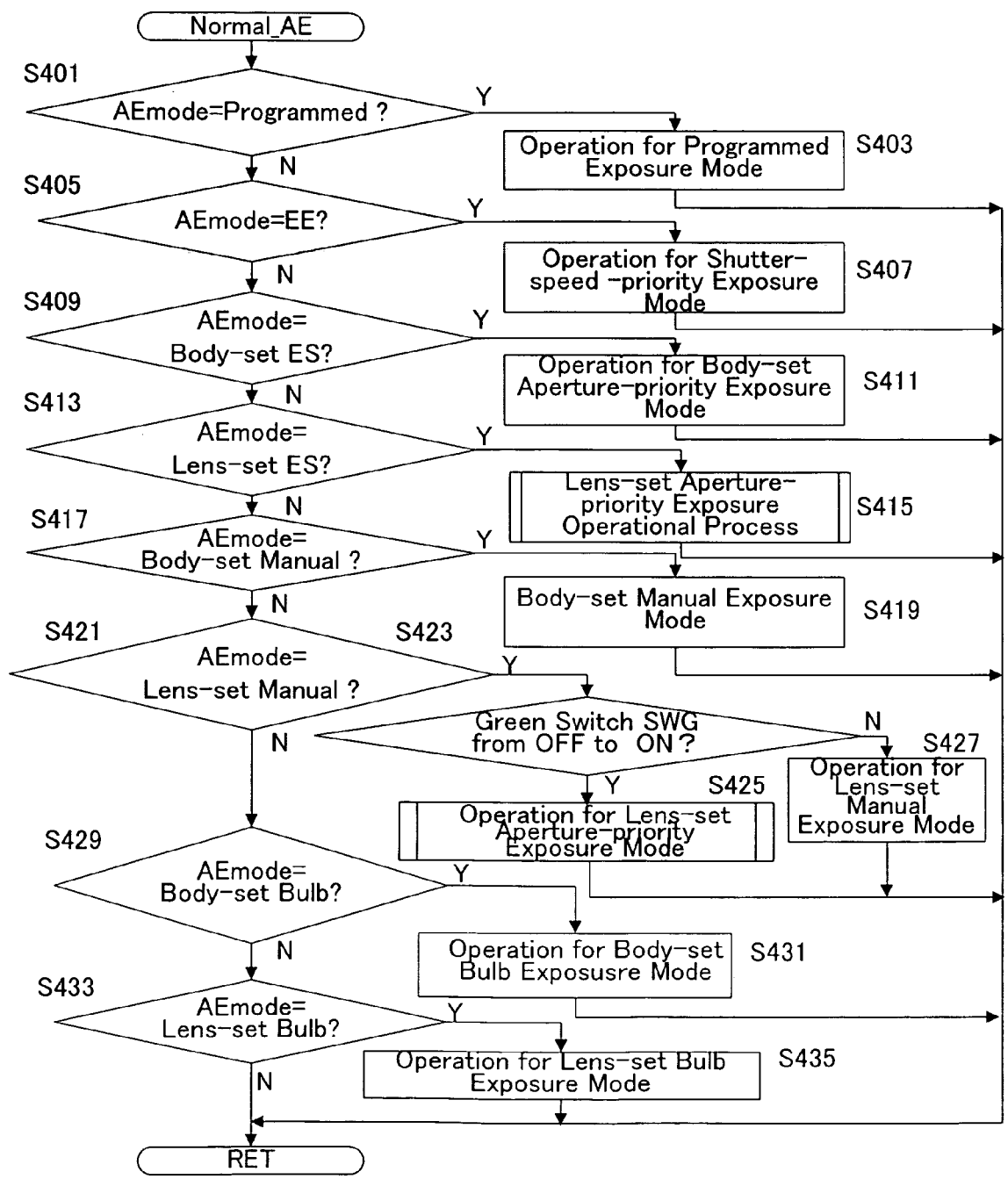
FIG. 8 is a flow chart showing a subroutine "NORMAL AE" shown in FIG. 7.

The fixed-light AE calculation process performed at step S319 will be hereinafter discussed in detail with reference to the flow chart shown in FIG. 8. In this process, a correct shutter speed and an f-number are determined by an exposure operation corresponding to a selected exposure mode (AEmode). Specifically, in this process it is determined whether the set exposure mode is a programmed exposure mode (step S401), whether the set exposure mode is an EE exposure mode (step S405), whether the set exposure mode is a body-set ES exposure mode (step S409), whether the set exposure mode is a lens-set ES exposure mode (step S413), whether the set exposure mode is a body-set manual exposure mode (step S417), whether the set exposure mode is the lens-set manual exposure mode (step S421), whether the set exposure mode is a body-set bulb exposure mode (step S429), or whether the set exposure mode is a lens-set bulb exposure mode (step S433). If the set exposure mode is the programmed exposure mode (if YES at step S401), an operation for programmed exposure mode is performed (step S403), and control returns. If the set exposure mode is the EE exposure mode (if YES at step S405), an operation for shutter-speed-priority exposure mode is performed (step S407), and control returns. If the set exposure mode is the body-set ES exposure mode (if YES at step S409), an operation for body-set aperture-priority exposure mode is performed (step S411), and control returns. If the set exposure mode is the lens-set ES exposure mode (if YES at step S413), a lens-set aperture-priority exposure calculation process is performed (step S415), and control returns. If the set exposure mode is the body-set manual exposure mode (if YES at step S417), an operation for body-set manual exposure mode is performed (step S419), and control returns. If the set exposure mode is the lens-set manual exposure mode (if YES at step S421), either the lens-set aperture-priority exposure calculation process or an operation for the lens-set manual exposure mode is performed (step S425 or S427) and control returns. If the set exposure mode is body-set bulb exposure mode (if YES at step S429), an operation for body-set bulb exposure mode is performed (step S431), and control returns. If the set exposure mode is lens-set bulb exposure mode (if YES at step S433), an operation for lens-set bulb exposure mode is performed (step S435), and control returns. The determined combination of a correct shutter speed and an f-number is stored in the RAM 11a and indicated on each of the external LCD panel 75 and the finder LCD 33 in the viewfinder of the camera body 10.

If the set exposure mode is the lens-set manual exposure mode (if YES at step S421), it is determined whether the green switch SWG has been turned from OFF to ON (step S423). If the green switch SWG has been turned from OFF to ON (if YES at step S423), the lens-set aperture-priority exposure calculation process is performed (step S425) to determine a shutter speed, and control returns. If the green switch SWG has not been turned from OFF to ON (if NO at step S423), an operation for the lens-set manual exposure mode is performed (step S427) to determine a shutter speed and control returns.

The lens-set aperture-priority exposure mode is a type of aperture-priority auto exposure mode in which the f-number is set by the manual aperture setting device of the photographing lens 100 while a correct shutter speed to be set is determined in accordance with the set f-number.

The lens-set manual exposure mode is a type of manual exposure mode in which the f-number is set by the manual aperture setting device while a shutter speed which is manually selected on the camera body 10 is set.

Lens-Set Aperture-Priority Exposure Calculation Process

Figure 10:
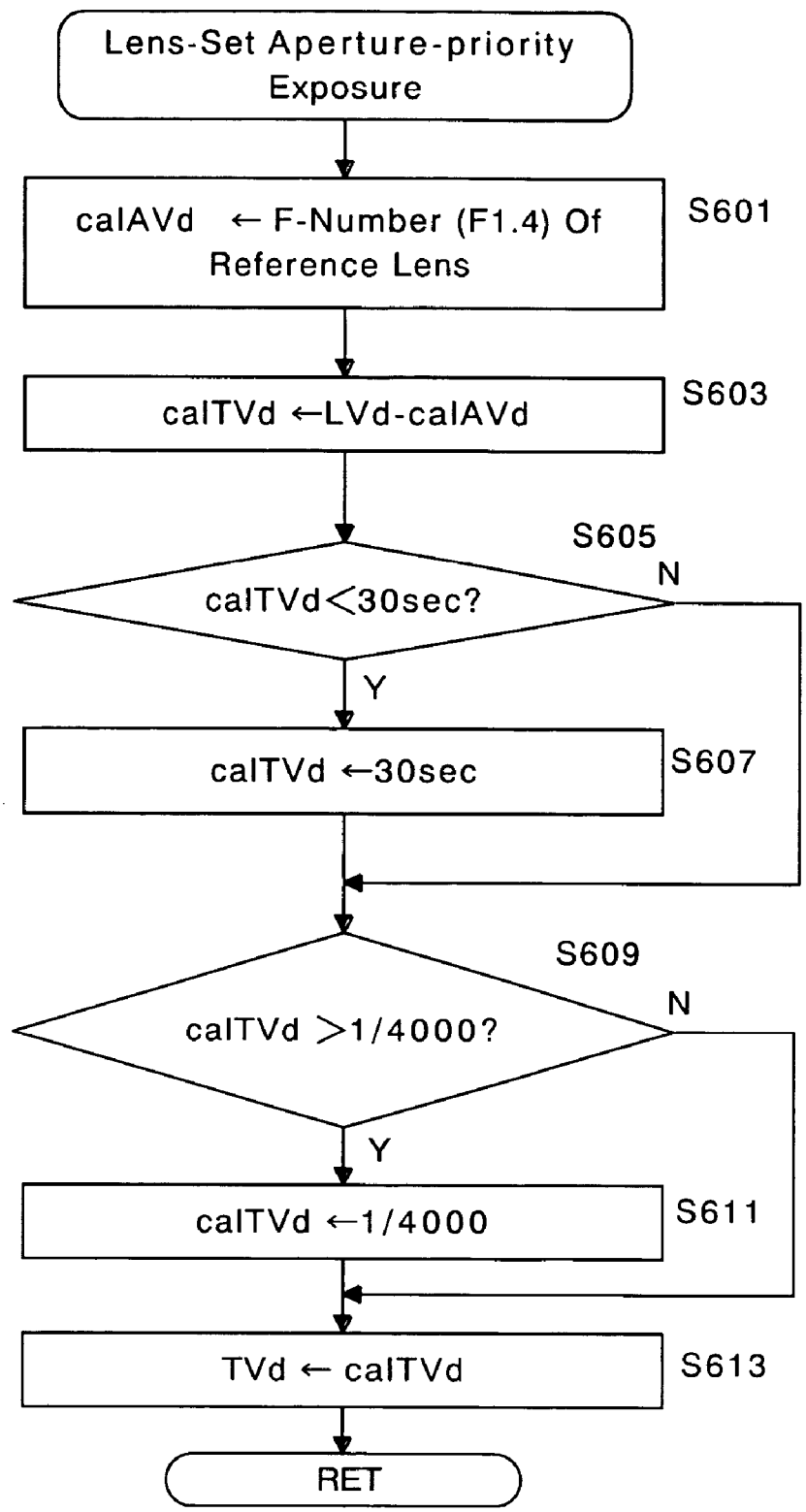
FIG. 10 is a flow chart showing a subroutine "LENS-SET APERTURE-PRIORITY EXPOSURE" shown in FIG. 8.

The lens-set aperture-priority exposure calculation process performed at steps S415 and S425 will be hereinafter discussed in detail with reference to the flow chart shown in FIG. 10.

In this process, firstly the f-number, as a value of the APEX system, of a reference lens is assigned to an operation f-number calAVd (step S601). For instance, an f-number corresponding to F1.4 is assigned to the operation f-number calAVd.

Subsequently, the operation f-number calAVd is subtracted from the exposure value LVd determined at step S313 to determine an operation shutter speed calTVd (step S603).

Subsequently, it is determined whether the operation shutter speed calTVd is smaller than a speed value (SV) of 30 seconds, as a value of the APEX system, (whether the operation shutter speed calTVd is slower than a slowest shutter speed or greater than a longest exposure time) (step S605). Control proceeds to step S607 if the operation shutter speed calTVd is smaller than the speed value (SV) of 30 seconds (if YES at step S605), or proceeds to step S609 if the operation shutter speed calTVd is equal to or greater than the speed value (SV) of 30 seconds (if NO at step S605). Subsequently, it is determined whether the operation shutter speed calTVd is greater than a speed value (SV) of 1/4000 seconds, as a value of the APEX system, (whether the operation shutter speed calTVd is faster than the fastest shutter speed of the camera body 10) (step S609). Control proceeds to step S611 if the operation shutter speed calTVd is greater than the speed value (SV) of 1/4000 seconds (if YES at step S609), or proceeds to step S613 if the operation shutter speed calTVd is equal to or smaller than the speed value (SV) of 1/4000 seconds (if NO at step S609). If the operation shutter speed calTVd is not smaller than the speed value (SV) of 30 seconds (if NO at step S605) and if the operation shutter speed calTVd is not greater than the speed value (SV) of 1/4000 seconds (if NO at step S609), control skips the operations at steps S607 and S611, the operation shutter speed calTVd is assigned to a set shutter speed TVd (step S613), and control returns.

If the operation shutter speed calTVd is smaller than the speed value (SV) of 30 seconds (if YES at step S605), the operation shutter speed calTVd is set to 30 seconds (step S607). If the operation shutter speed calTVd is greater than the speed value (SV) of 1/4000 seconds (if YES at step S609), the calculation shutter speed is set to 1/4000 seconds (step S611). Thereafter, the set operation shutter speed calTVd is assigned to the set shutter speed TVd (step S613), and control returns.

The calculation shutter speed calTVd which is determined by the above described operations at steps S601 through step S611 is set as the set shutter speed TVd, which is in turn stored in the RAM 11a to be used as a shutter speed at a shutter release (at a time of exposure).

Flash AE Calculation Process

Figure 9:
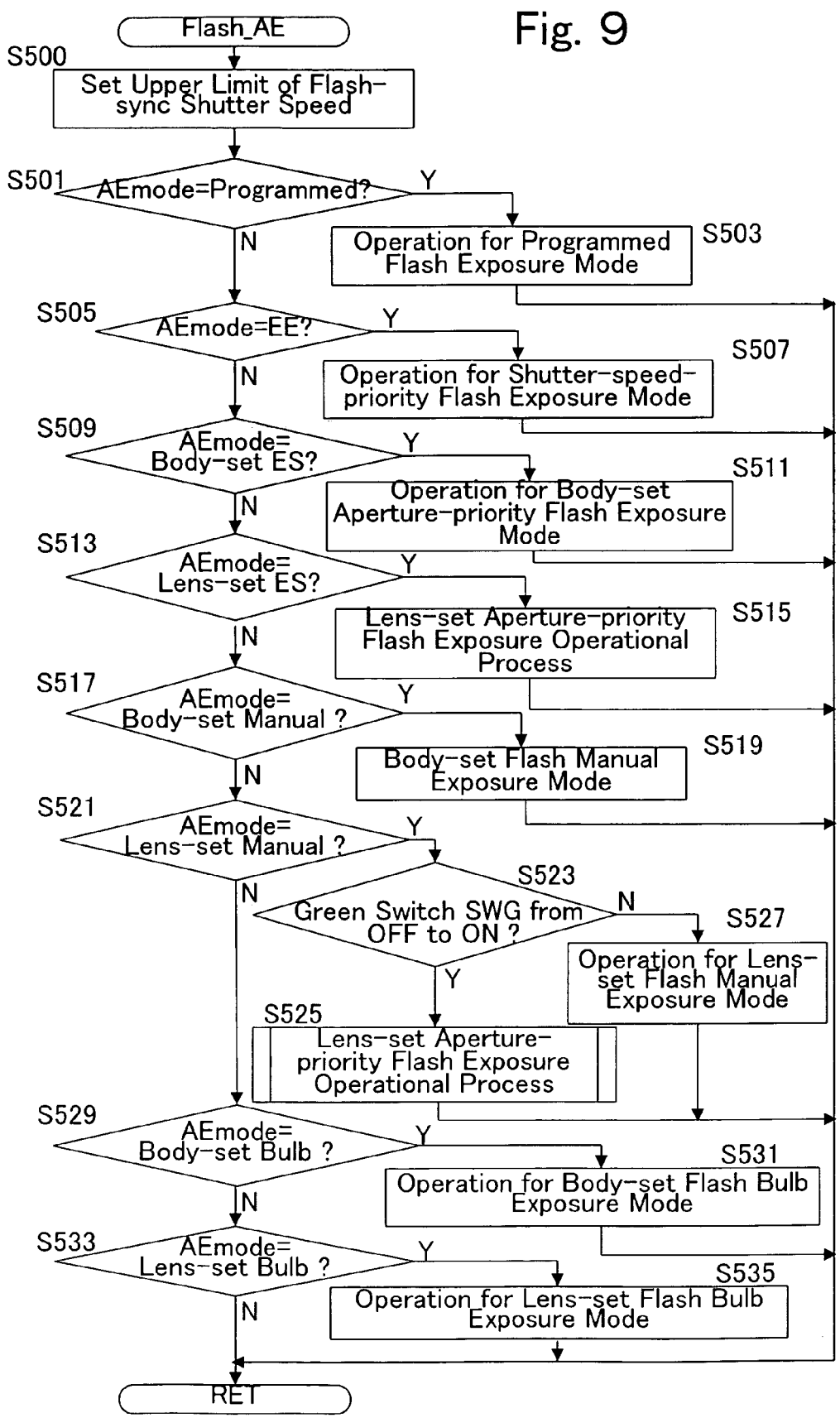
FIG. 9 is a flow chart showing a subroutine "FLASH AE OPERATION" shown in FIG. 7.

The flash AE calculation process performed at step S317 will be hereinafter discussed in detail with reference to the flow chart shown in FIG. 9. In this process, a correct shutter speed and an f-number are determined by an algorithm of a flash AE mode (Flash_AE). Specifically, in this process, firstly the upper limit of the shutter speed for flash photography (flash-sync shutter speed) is set (step S500). Subsequently, it is determined whether the set exposure mode is a programmed flash exposure mode (step S501), whether the set exposure mode is a flash EE exposure mode (step S505), whether the set exposure mode is a body-set flash ES exposure mode (step S509), whether the set exposure mode is a lens-set flash ES exposure mode (step S513), whether the set exposure mode is a body-set flash manual exposure mode (step S517), whether the set exposure mode is the lens-set flash manual exposure mode (step S521), whether the set exposure mode is a body-set flash bulb exposure mode (step S529), and whether the set exposure mode is a lens-set flash bulb exposure mode (step S533). If the set exposure mode is a programmed flash exposure mode (if YES at step S501), an operation for programmed flash exposure mode is performed (step S503), and control returns. If the set exposure mode is a flash EE exposure mode (if YES at step S505), an operation for a shutter-speed-priority flash exposure mode is performed (step S507), and control returns. If the set exposure mode is a body-set flash ES exposure mode (if YES at step S509), an operation for a body-set aperture-priority flash exposure mode is performed (step S511), and control returns. If the set exposure mode is a lens-set flash exposure mode (if YES at step S513), a lens-set aperture-priority flash exposure calculation process is performed (step S515), and control returns. If the set exposure mode is a body-set flash manual exposure mode (if YES at step S517), an operation for the body-set flash manual exposure mode is performed (step S519), and control returns. If the set exposure mode is the lens-set flash manual exposure mode (if YES at step S521), either the lens-set aperture-priority flash exposure calculation process or an operation for the lens-set flash manual exposure mode is performed (step S525 or S527), and control returns. If the set exposure mode is body-set flash bulb exposure mode (if YES at step S529), an operation for body-set flash bulb exposure mode is performed (step S531), and control returns. If the set exposure mode is lens-set flash bulb exposure mode (if YES at step S533), an operation for lens-set flash bulb exposure mode is performed (step S535), and control returns. The determined combination of a correct shutter speed and an f-number is stored in the RAM 11a and indicated on each of the external LCD panel 75 and the finder LCD 33 in the viewfinder of the camera body 10.

If the set exposure mode is the lens-set flash manual exposure mode (if YES at step S521), it is determined whether the green switch SWG has been turned from OFF to ON (step S523). If the green switch SWG has been turned from OFF to ON (if YES at step S523), the lens-set aperture-priority flash exposure calculation process is performed (step S525) to determine a shutter speed, and control returns. If the green switch SWG has not been turned from OFF to ON (if NO at step S523), an operation for the lens-set flash manual exposure mode is performed (step S527) to determine a shutter speed, and control returns.

The lens-set aperture-priority flash-exposure mode is a type of aperture-priority auto exposure mode in which the f-number is set by the manual aperture setting device of the photographing lens 100 while a correct shutter speed to be set at flash photography is determined in accordance with the set f-number.

The lens-set flash manual exposure mode is a type of manual exposure mode in which the f-number is set by the manual aperture setting device by the manual aperture setting device of the photographing lens 100 while a shutter speed which is manually selected on the camera body 10 is set.

Lens-Set Aperture-Priority Flash Exposure Calculation Process

Figure 11:
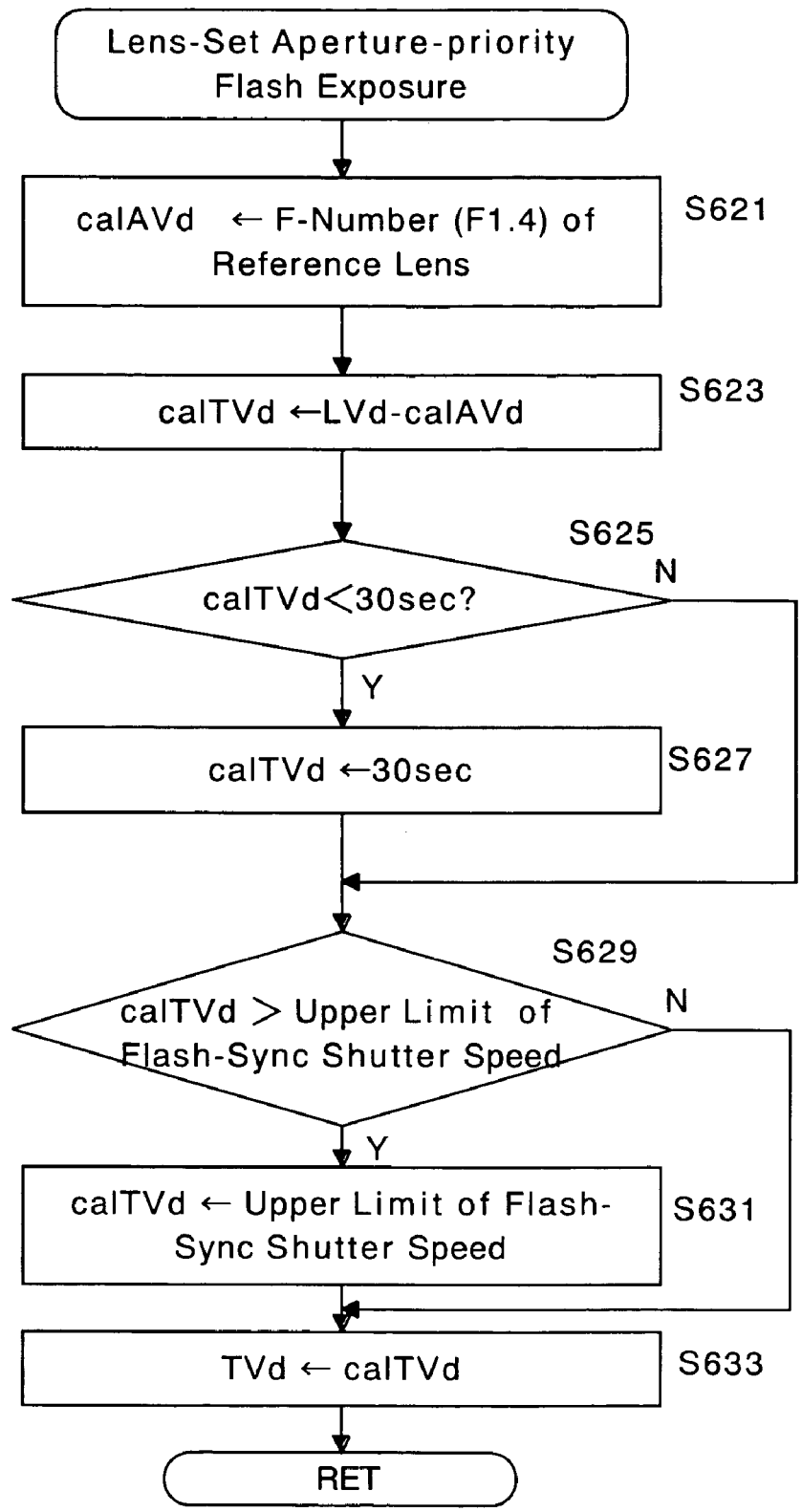
FIG. 11 is a flow chart showing a subroutine "LENS-SET APERTURE-PRIORITY FLASH EXPOSURE" shown in FIG. 9.

The lens-set aperture-priority flash exposure calculation process performed at steps S515 and S525 will be hereinafter discussed in detail with reference to the flowchart shown in FIG. 11.

In this process, firstly the f-number of a reference lens, as a value of APEX system, is assigned to an operation f-number calAVd (step S621).

Subsequently, the operation f-number calAVd is subtracted from the exposure value LVd determined at step S313 to determine an operation shutter speed calTVd (step S623).

Subsequently, it is determined whether the operation shutter speed calTVd is smaller than a speed value (SV) of 30 seconds, which is a value of the APEX system (step S625). Control proceeds to step S627 if the operation shutter speed calTVd is smaller than the speed value (SV) of 30 seconds (if YES at step S625), or proceeds to step S629 if the operation shutter speed calTVd is equal to or greater than the speed value (SV) of 30 seconds (if NO at step S625). Subsequently, it is determined whether the operation shutter speed calTVd is greater than the upper limit of the shutter speed for flash photography (flash-sync shutter speed) (step S629). Control proceeds to step S631 if the operation shutter speed calTVd is greater than the upper limit of the shutter speed for flash photography (if YES at step S629), or proceeds to step S633 if the operation shutter speed calTVd is equal to or smaller than the upper limit of the shutter speed for flash photography (if NO at step S629). If the operation shutter speed calTVd is not smaller than the speed value (SV) of 30 seconds (if NO at step S625) and if the operation shutter speed calTVd is not greater than the upper limit of the shutter speed for flash photography (if NO at step S629), control skips the operations at steps S627 and S631, the operation shutter speed calTVd is assigned to a set shutter speed TVd (step S633), and control returns.

If the operation shutter speed calTVd is smaller than the speed value (SV) of 30 seconds (if YES at step S625), the operation shutter speed calTVd is changed to 30 seconds (step S627). If the operation shutter speed calTVd is greater than the upper limit of the shutter speed for flash photography (if YES at step S629), the calculation shutter speed is changed to the upper limit of the shutter speed for flash photography (step S631). Thereafter, the operation shutter speed calTVd thus changed is assigned to the set shutter speed TVd (step S633), and control returns.

The calculation shutter speed calTVd which is determined by the above described operations at steps S621 through step S631 is set as the set shutter speed TVd, which is in turn stored in the RAM 11a to be used as a shutter speed at a shutter release (at a time of exposure).

As can be understood from the foregoing, according to the above illustrated embodiment of the camera system according to the present invention, correct exposure is possible with the f-number set on the photographing lens side even if the camera body cannot detect the f-number set on the photographing lens side because a correct shutter speed is determined by performing a photometering operation with the diaphragm of the photographing lens being stopped down if the green switch SWG is turned ON. Moreover, more appropriate shutter speed and exposure value can be obtained because the photometering operation is performed with the diaphragm being stopped down to a point corresponding to a desired f-number.

Although the stop-down photometering is performed when the green switch SWG is turned ON in the case where the aperture setting ring of the photographing lens is set to a fixed aperture setting position (manual setting position) in the above described embodiment of the camera system, in a state where the aperture setting ring of the photographing lens is in an auto aperture setting position and in a state where an automatic exposure mode such as the programmed AE mode is selected, the aperture setting ring can be rotatably moved to a fixed aperture setting position, and when the green switch SWG is switched ON, stop-down photometering can be performed, and whether a correct exposure is obtained or not can be indicated, or an appropriate shutter speed for a lens-set aperture-priority mode can be calculated and set.

The present invention can be applied to not only a conventional SLR camera using sensitive film, but also an SLR digital camera using an image sensor such as CCD or CMOS image sensor. In addition, the present invention can be applied to a camera body provided with a device for detecting the f-number set by a manual aperture setting device of an interchangeable lens mounted to the camera body.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera system comprising:
   a camera body including a photometering device and an external operating device; and
   a photographing lens which is detachably attached to said camera body, said photographing lens including an aperture setting device for selecting an auto aperture setting and at least one fixed aperture setting,
   wherein a full-aperture photometering operation is performed when said aperture setting device is positioned at said auto aperture setting, and a stop-down photometering operation is performed in response to an operation of said external operating device when said aperture setting device is positioned at said fixed aperture setting.

2. The camera system according to claim 1, wherein said camera system comprises an SLR camera including said camera body and said photographing lens.

3. The camera system according to claim 2, wherein said external operating device comprises a button which is provided on said camera body.

4. A camera system comprising:
   a camera body including an external operating device;
   a photographing lens which is detachably attached to said camera body, said photographing lens including an aperture setting device for selecting an auto aperture setting and at least one fixed aperture setting;
   a stop-down device for stopping down a diaphragm of said photographing lens of said camera system;
   a photometering device provided in said camera body for photometering a brightness of object light passed through said photographing lens; and
   a controller which controls operations of said stop-down device and said photometering device;
   wherein said controller makes said photometering device perform a full-aperture photometering when said aperture setting device is positioned at said auto aperture setting, and said controller drives said stop-down device to stop down said diaphragm and makes said photometering device perform a stop-down photometering in response to an operation of said external operating device when said aperture setting device is positioned at said fixed aperture setting.

5. The camera system according to claim 4, comprising a processor for determining an appropriate shutter speed in accordance with a brightness value obtained from said stop-down photometering of said photometering device.

6. The camera system according to claim 5, wherein said controller comprises a selectable specific exposure mode in which said stop-down photometering is performed when said external operating device is operated,
   wherein said controller drives said stop-down device to stop down said diaphragm and makes said photometering device perform said stop-down photometering, and makes said processor determine said proper shutter speed in accordance with said brightness value obtained from said stop-down photometering when said external operating device is operated in said specific exposure mode.

7. The camera system according to claim 5, wherein said controller drives said stop-down device to stop down said diaphragm and makes said photometering device perform said stop-down photometering, and makes said processor determine said appropriate shutter speed in accordance with said brightness value obtained from said stop-down photometering when said external operating device is operated in the case where said controller detects that said aperture setting ring is not positioned at said auto aperture setting.

8. The camera system according to claim 5, wherein said processor determines said appropriate shutter speed in accordance with said brightness value, which is obtained from said stop-down photometering, an ISO speed value and a reference f-number when said photometering device performs said stop-down photometering.

9. The camera system according to claim 5, further comprising an indicator which visually indicates said appropriate shutter speed determined by said processor.

10. The camera system according to claim 5, further comprising a memory in which a shutter speed determined by said processor is stored,
    wherein an exposure is performed at said shutter speed stored in said memory.

11. The camera system according to claim 4, wherein said camera system comprises an SLR camera including said camera body and said photographing lens.

12. The camera system according to claim 11, wherein said external operating device comprises a button provided on said camera body.

13. A camera body to which a photographing lens, including an aperture setting device for selecting an auto aperture setting and at least one fixed aperture setting, is detachably attached, said camera body comprising: a stop-down device for stopping down a diaphragm of said photographing lens;
    a photometering device for photometering a brightness of object light passed through said photographing lens;

a controller which controls operations of said stop-down device and said photometering device; and
an external operating device,
wherein said controller makes said photometering device perform a full-aperture photometering when said aperture setting device is positioned at said auto aperture setting, and said controller drives said stop-down device to stop down said diaphragm and makes said photometering device perform a stop-down photometering in response to an operation of said external operating device when said aperture setting device is positioned at said fixed aperture setting.

14. The camera body according to claim 13, comprising a processor for determining an appropriate shutter speed in accordance with a brightness value obtained from said stop-down photometering of said photometering device.

15. The camera body according to claim 14, wherein said controller comprises a selectable specific exposure mode in which said stop-down photometering is performed when said external operating device is operated,
wherein said controller drives said stop-down device to stop down said diaphragm and makes said photometering device perform said stop-down photometering, and makes said processor determine said proper shutter speed in accordance with said brightness value obtained from said stop-down photometering when said external operating device is operated in said specific exposure mode.

16. The camera body according to claim 14, wherein said controller drives said stop-down device to stop down said diaphragm and makes said photometering device perform said stop-down photometering, and makes said processor determine said appropriate shutter speed in accordance with said brightness value obtained from said stop-down photometering when said external operating device is operated in the case where said controller detects that said aperture setting device is not positioned at said auto aperture setting.

17. The camera body according to claim 14, wherein said processor determines said appropriate shutter speed in accordance with said brightness value, which is obtained from said stop-down photometering, an ISO speed value and a reference f-number when said photometering device performs said stop-down photometering.

18. The camera body according to claim 14, further comprising an indicator which visually indicates said appropriate shutter speed determined by said processor.

19. The camera body according to claim 14, further comprising a memory in which a shutter speed determined by said processor is stored,
wherein an exposure is performed at said shutter speed stored in said memory.

20. The camera body according to claim 13, wherein said camera body comprises an SLR camera body.

* * * * *